United States Patent Office 3,119,179
Patented Jan. 28, 1964

3,119,179
SOLDERING FLUX AND METHOD
William S. Gale, Brookline, Mass., assignor to McCord Corporation, Detroit, Mich., a corporation of Maine
No Drawing. Continuation of application Ser. No. 366,628, July 7, 1953. This application Mar. 10, 1958, Ser. No. 720,022
4 Claims. (Cl. 29—495)

This invention relates to soldering fluxes and methods and has particular reference to flux compositions and methods that are particularly suitable for solder coating and/or joining of aluminum.

I have discovered that a composition of matter comprising essentially at least one ammonium halide stannate salt admixed with zinc and/or cadmium dihydrazinium chloride and/or bromide provides an excellent soldering flux which is particularly suitable for the soldering, joining and/or coating of aluminum, although it is also useful in soldering other metals. I have also discovered that 2,3 butylene glycol forms an excellent solvent or carrier for such a composition.

A principal object of the invention is to provide a novel and efficient soldering flux and method which are particularly useful for soldering aluminum to itself and other metals.

According to my invention, a composition of matter suitable for use as a soldering flux comprises essentially as a first component at least one compound according to the formula $(NH_4)_2SnY_4Z_2$, wherein Y and Z are the same or different halogens, and as a second component at least one compound selected from the group consisting of zinc dihydrazinium chloride, zinc dihydrazinium bromide, cadmium dihydrazinium chloride, and cadmium dihydrazinium bromide.

I have found that this composition of matter may be used in a dry form, or that it may also be admixed with any suitable solvent, carrier or vehicle. I have discovered that 2,3 butylene glycol ($CH_3CHOHCHOHCH_3$) is an excellent solvent or carrier for such salt composition and in addition enhances the fluxing action thereof.

In soldering it is desirable that the flux composition be effective (i.e., have a melting point or range) at a temperature at and slightly below soldering temperature, that is, the melting or liquidus temperature of the solder being used. Solders useful for joining aluminum to itself and other metals usually contain zinc, such as 30/70 tin-zinc, or 60/40 zinc-cadmium. The percentages of one or more of the components of the solder alloy may vary widely, depending upon the requirements of the specific soldering application. The phase diagrams for the alloys commonly used for soldering, including those mentioned above, show that the liquidus temperatures of such solders may vary from 280° to 700° F.

For each particular soldering application it is important, in selecting the solder to be used, to take into consideration the metals to be joined, the soldering process to be used, and the function of the solder joint. In selecting a flux which will most effectively promote soldering with the solder to be used, it is important to take into consideration such factors as the nature and condition of the metals to be joined, the type of solder joint to be formed, the method of soldering, and the characteristics (including the melting point or range) of the solder being used.

I have found that the essential components of the fluxing salt mixture may be admixed in a wide range of proportions and that mixtures wherein the ratios of the components are or approach the eutectic mixture proportions of such components appear to yield the best results. The melting point or range of the flux mixture may be varied by varying the percentages of the essential components of the flux mixture, or by admixing agents therewith to lower the temperature at which the flux becomes effective as a soldering agent. The proportions of the two essential components of the flux mixture do not appear to be critical and any proportions which will provide effective soldering are suitable.

One example of the fluxing salt composition that gave excellent results is a mixture of 40 grams of ammonium chlorostannate and 2 grams of zinc dihydrazinium chloride $(Zn(N_2H_4)_2Cl_2)$. This flux was prepared by admixing the dry powder of each of these salts and then grinding them intimately together. This specific mixture was used in soldering stranded aluminum battery cables. The end of the cable was heated sufficiently so that when it was dipped into the dry flux powder, the flux in contact with the heated end of the cable melted sufficiently so as to adhere to the aluminum cable when it was withdrawn from the flux. The fluxed end of the cable was then dipped in a molten solder bath of 30/70 tin-zinc maintained at a temperature between 750° and 800° F. This soldering operation produced an excellent joint between the strands of the cable, and examination disclosed that there was practically no residue of any kind in or around the joint.

The ammonium halide salt component may comprise one or more of the salts of this group, such for example as ammonium bromostannate $[(NH_4)_2SnBr_6]$, ammonium fluorostannate $[(NH_4)_2SnF_6]$, ammonium dibromotetrachlorostannate $[(NH_4)_2SnBr_2Cl_4]$, and ammonium dichlorotetrabromostannate $[(NH_4)_2SnCl_2Br_4]$.

Flux as per the foregoing example was also used in solder joining stamped brass terminals, cast brass terminals, and stamped aluminum terminals, respectively, to the ends of stranded aluminum cables. After such terminals were crimped on the ends of stranded aluminum cables, the terminals and cable ends were heated and dipped in such flux in a powdered form as previously described and then dipped in molten 30/70 tin-zinc solder. Subsequent examination disclosed that all the strands of each of the cables were bonded together as a mass and integrally joined to their respectively terminals. Also there was very little residue left after soldering and no evidence that such residue had any corrosive effect on the joint.

Fluxes according to my invention are easily prepared, are substantially non-hygroscopic, and appear to be stable over long periods of time, even when exposed to atmospheric conditions of high humidity.

As another example, I have used with excellent results mixtures comprising 45 grams of ammonium chlorostannate and 5.2 grams of zinc dihydrazinium chloride admixed with 2,3 butylene glycol.

The salt mixtures were admixed with 2,3 butylene glycol to form compositions in which the salt mixture comprised from 40% to 62½% by weight of the total mixture, but these proportions do not appear to be critical and any proportions which will provide effective soldering are suitable. The 2,3 butylene glycol I have found to be particularly advantageous for use with the salt mixture described, although such fluxing salt mixture may be admixed with other suitable known vehicles, carriers or solvents, such for example as ethylene glycol, rosin, acetone, etc.

As another example, the specific composition last described was used in the soldering of stamped brass and cast brass terminals to 1/0 aluminum conductors similar in form to the copper conductors used as battery cables and ignition cables for automobiles. The terminals were crimped on the ends of the cables and dipped in the flux composition. The fluxed ends were then immersed for a few seconds in a molten solder bath containing a 30/70 mixture of tin-zinc. The temperature of the bath was between 750 and 800° F. When removed from the solder bath and allowed to cool, the terminals were integrally united into a solid mass with all of the strands of the cables. Practically no residue of any kind was left near the joint. Such residue as did remain was readily removed simply by blowing with air. The type of joint which was obtained not only had highly desirable physical properties but also electrical properties as well.

As another example, the armature of an electric starting motor for an automobile was wound with aluminum coils in place of the copper coils ordinarily used. These coils were mechanically clenched in tinned copper lugs or ears which were joined to the copper commutator segments. The problem was to solder the ends of the aluminum conductors to the commutator segments to provide a good electrical path from the commutator to the coil. This was done by applying the last described flux composition to the place where it was desired to solder. The armature was then immersed in a molten solder bath in the same manner as is ordinarily practiced in the manufacture of this item. The composition of the solder bath was 30/70 tin-zinc and the temperature of the bath was maintained between 750 and 800° F. The time of soldering was but a few seconds. After the armature had been removed from the solder bath and allowed to cool, it was observed that perfect soldering had been obtained between the terminations of the aluminum coils and the commutator segments. The excess solder clinging to the commutator segments was removed on a lathe in the same manner ordinarily used in the manufacture of the armature, and then the completed armature was assembled in a starting motor which was tested successfully. To my knowledge this is the first electric starting motor ever so constructed. Another armature similarly made was subjected to humidity tests and it was found that the residues, if any, of the flux resulting from the soldering operation did not appear to have a corrosive effect on soldered bonds that had been obtained.

Other examples of the flux compositions prepared and successfully used to achieve the spread of solder alloys upon aluminum, to make solder joints, and to coat the surface of aluminum with solder are:

A tin-cadmium eutectic composition consisting of 39.5% by weight of cadmium dihydrazinium bromide and the balance ammonium fluorostannate.

A composition consisting of 45 grams of ammonium chlorostannate, 4.4 grams of zinc dihydrazinium chloride, and 45 grams of 2,3 butylene glycol. In this composition the zinc dihydrazinium chloride comprised 9.5% of the salt composition.

A composition consisting of 90 grams of ammonium chlorostannate and 5 grams of zinc dihydrazinium chloride.

A eutectic mixture composition consisting of 39.5% by weight of cadmium dihydrazinium bromide and the balance ammonium chlorostannate.

A eutectic mixture composition consisting of cadmium dihydrazinium bromide and ammonium chlorostannate in the ratio of 9.88 to 20.8 parts by weight.

A tin-zinc eutectic composition consisting of 2.92 parts by weight of zinc dihydrazinium chloride and 48.8 parts by weight of ammonium bromostannate, a ratio of 1 to 16.7.

A tin-zinc eutectic composition consisting of 12.38% zinc dihydrazinium bromide and the balance ammonium chlorostannate.

A tin-zinc eutectic composition consisting of 12.38% by weight of zinc dihydrazinium bromide and the balance ammonium chlorostannate.

A tin-zinc eutectic composition consisting of 16.2% by weight of zinc dihydrazinium bromide and the balance ammonium chlorostannate.

A tin-zinc eutectic composition consisting of 5.2% by weight of zinc dihydrazinium chloride and the balance ammonium bromostannate.

In the examples hereinbefore specified the percentages of the metal hydrazine salt are stated with reference to the total flux salt composition, including the metal hydrazine salt but excluding the solvent or carrier if any. In the example given on page 3 of the specification the percentage of metal hydrazine salt in the composition is 4.76%. In the example given in the specification on page 5, paragraph 3, the percentage of the metal hydrazine salt in the flux composition is 10.35%.

The efficiency and utility of the foregoing fluxing salt compositions may be increased for some applications by admixing the same with one or more of the following group of salts: salts of ammonia, salts of morpholine, alkylamines, arylamines, aralkylamines, cycloalkylamines, or saturated heterocyclic nitrogen compounds carrying one or more nitrogens in the ring. The amount of such salts which can be used is not critical and will depend upon a number of factors, such as the type of joint and its intended use, the metals of the solder system, and the fluxing and soldering processes employed. Among the hydroxylamine salts which may be used are hydroxylamine hydrochloride and hydroxylamine hydrobromide. Among the alkylamines, arylamines, aralkylamines, alkylamines and cycloalkylamines which can be used in the form of their salts are those which fall in the scope of the formula $R_1R_2R_3N$, in which $R_1$, $R_2$, and $R_3$ are the same or different and are, for example, hydrogen methyl, ethyl, normal propyl, isopropyl, normal butyl, isobutyl, secondary butyl, tertiary butyl, phenyl, benzyl, phenylethyl, orthotolyl, metatolyl, paratolyl, xylyl, cyclopentyl, and cyclohexyl radicals. For example, among the amines which can be used in the form of their salts are methylamine, dimethylamine, trimethylamine, methylethylamine, triethylamine, monoisopropylamine, diisopropylamine, aniline, benzylamine, phenylethylamine, orthotolylamine, metatolylamine, paratolylamine, the xylidines, methyl aniline, dimethyl aniline, diethyl aniline, cyclohexylamine, ethylenediamine, etc. Piperidine in salt form can also be used.

In place of the hydroxylamine salts, morpholine salts, ammonium salts, and amine salts there can be used compounds of the formula $R_4R_5R_6R_7NX$ in which $R_4$, $R_5$, $R_6$ and $R_7$ are substituents selected from the group consisting of the methyl and ethyl radicals and in which X is a halogen atom, for example, tetraethyl ammonium chloride or tetraethyl ammonium bromide.

Among the ammonium salts which can be used are ammonium chloride, ammonium bromide, ammonium carbonate, and ammonium phosphate.

While the fluxes and processes herein disclosed may be used according to any known methods, I have found them to be particularly useful in solder dipping operations.

This application is a continuation of my prior now abandoned application Serial No. 366,628 filed July 7, 1953, for "Soldering Flux and Method."

I claim:
1. A composition of matter suitable for use as a soldering flux consisting essentially of as a first component at least one salt according to the formula $(NH_4)_2SnY_4Z_2$, wherein Y and Z are halogens, and as a second component at least one salt selected from the group consisting of the dihydrazinium salts of zinc and cadmium chloride and bromide, said components being admixed in ratios approximating the eutectic mixture proportions thereof.

2. A composition according to claim 1 admixed with ethylene glycol ($CH_2OHCH_2OH$).

3. In soldering, the step of applying to the metal to be soldered a solder and the flux composition defined by claim 1.

4. In soldering, the step of applying to the metal to be soldered a solder and the flux composition defined by claim 2.

References Cited in the file of this patent

UNITED STATES PATENTS

| | | |
|---|---|---|
| 2,172,979 | Kohler | Sept. 12, 1939 |
| 2,640,793 | Doerr | June 2, 1953 |